United States Patent [19]

Lupi

[11] Patent Number: 6,068,547
[45] Date of Patent: May 30, 2000

[54] SYSTEM FOR THE PROFILE MACHINING WITH TEMPLATES OF SLABS OF MARBLE, STONE, GLASS AND THE LIKE

[76] Inventor: Quintilio Lupi, 7 Kings Road, London, NW10 2BL, United Kingdom

[21] Appl. No.: 09/314,021

[22] Filed: May 19, 1999

[30] Foreign Application Priority Data

May 20, 1998 [IL] Israel .............................. RM98A00321

[51] Int. Cl.[7] .................................................. B24B 41/06
[52] U.S. Cl. .............................. 451/388; 125/35; 269/21; 451/412
[58] Field of Search .................................. 451/388, 412, 451/237; 125/35; 269/21

[56] References Cited

U.S. PATENT DOCUMENTS

| | | | |
|---|---|---|---|
| 1,408,594 | 3/1922 | Hatcher | 451/388 |
| 3,880,048 | 4/1975 | Zimmerman . | |
| 4,805,887 | 2/1989 | Ray | 269/21 |
| 4,890,423 | 1/1990 | Bavelloni | 451/388 |
| 5,120,033 | 6/1992 | Shoda | 269/21 |
| 5,121,907 | 6/1992 | Engwall . | |
| 5,135,120 | 8/1992 | Given | 451/388 |
| 5,318,005 | 6/1994 | Mayer | 451/388 |
| 5,433,657 | 7/1995 | Bovone | 451/388 |
| 5,553,837 | 9/1996 | Kahle | 269/21 |

FOREIGN PATENT DOCUMENTS

| | | | |
|---|---|---|---|
| 57-127638 | 8/1982 | Japan . | |
| 61-257728 | 11/1986 | Japan . | |
| 0550968 | 1/1943 | United Kingdom | 451/388 |

*Primary Examiner*—Robert A. Rose
*Attorney, Agent, or Firm*—Nixon & Vanderhye P.C.

[57] ABSTRACT

A system for the profile machining of slabs (23) of marble, stone, glass and the like, using templates (31), comprises a plurality of mechanically adjustable pneumatically operating distance pieces or supporting blocks (1). Each distance piece or supporting block is adjustable for height by means of a screw (8) and nut (6) arrangement and is provided with suction seals (11) on its end surface to support the slab, (15, 16) on an annular step to fix the machining template, and (3) on its base to fix the assembly of slab and distance piece firmly to the workbench, as the slab is being machined. All the suction seals (3, 11, 15, 16) are connected to suction tubes (24) that terminate in a connecting nipple that is connected to a pneumatic vacuum source.

7 Claims, 6 Drawing Sheets

SYSTEM FOR THE PROFILE MACHINING WITH TEMPLATES OF SLABS OF MARBLE, STONE, GLASS AND THE LIKE

The present invention relates to a system for the profile machining of slabs of marble, stone, glass and the like, using templates, the system comprising a plurality of mechanically adjustable pneumatically operating distance pieces.

It has recently become fashionable to use marble, stone, granite and glass in interior design. This trend requires that manufacturers of marble machining equipment pay particular attention to systems for making work surfaces or worktops, especially for bathrooms and kitchens, as well as to any interior design work using stone material.

The use of templates in wood, PVC or other materials, for guiding cutting machines along a defined path on slabs of marble or the like, has long been known.

The largest firms in this industry have also equipped themselves with large numerically controlled machines which have the disadvantages of increasing costs and machining times where they are used on a non-industrial scale, or for individual pieces or short runs, because the labour and programming costs are not justified.

Other firms employ small or medium-sized equipment of the manual or semi-automatic type, but this has the disadvantages of leading to imperfections in the machining owing to the difficulty of clamping the template to be followed onto the slab.

In some types of machine, for example bench machines with a pivoting arm, it is known to mount a template on the top of the surface to be machined. The template is drilled and fitted in place with bolts connected to the template-holding frame, and the copying action is done by means of a long shaft or tracer which carries a follower wheel which during machining advances into contact with the template and determines when the machining is to end. This system involves an inevitable flexing of the arm carrying the follower wheel and therefore mars the outline being machined, with inevitable undulations.

Other systems, normally used with portable profiling machines, allow the template to be positioned against the slab to be machined, either above it or below it according to need, and held a suitable distance away from it by distance pieces interposed between the slab and the template, or by other means for raising the slab and template off the work surface. The whole assembly is then immobilized by somewhat insecure systems such as clamps or the like, which cause inevitable loss of time and practical difficulties of machining as the machine is unable to work in the areas in which the clamps are positioned, so consequently the clamps have to be repeatedly removed, while the wooden or PVC template inevitably tends to bend in the area on which the clamp is pressing.

The object of the present invention is to provide a system for retaining and anchoring the template and the workpiece in such a way as to obviate the disadvantages and drawbacks of known systems.

According to the present invention, the connection between the slab of marble, stone, glass or other material to be machined on the one hand, and the template and the supporting bench on the other hand, is obtained by means of a plurality of mechanically adjustable distance pieces or supporting blocks arranged around the profile that is to be produced on the workpiece slab. These distance pieces or supporting blocks are provided with suction components actuated by vacuum to guarantee a force of adhesion on the workpiece slab, on the template and on the supporting bench.

The distance pieces or supporting blocks of the system of the present invention are mechanically adjustable for height by means of a screw and nut arrangement and are provided with suction seals on their end surface to support the slab, on an annular step to fix the machining template, and on the base to fix the assembly of slab, template and distance piece firmly to a workbench, as the slab is being machined. All the suction seals are connected to suction tubes that terminate in a connecting nipple that is connected to a vacuum source such as a vacuum pump, an ejector or the like.

The system according to the present invention will now be described with reference to a currently preferred embodiment thereof, described for illustrative, non-restrictive purposes with reference to the attached drawings, in which.

Figure 1:
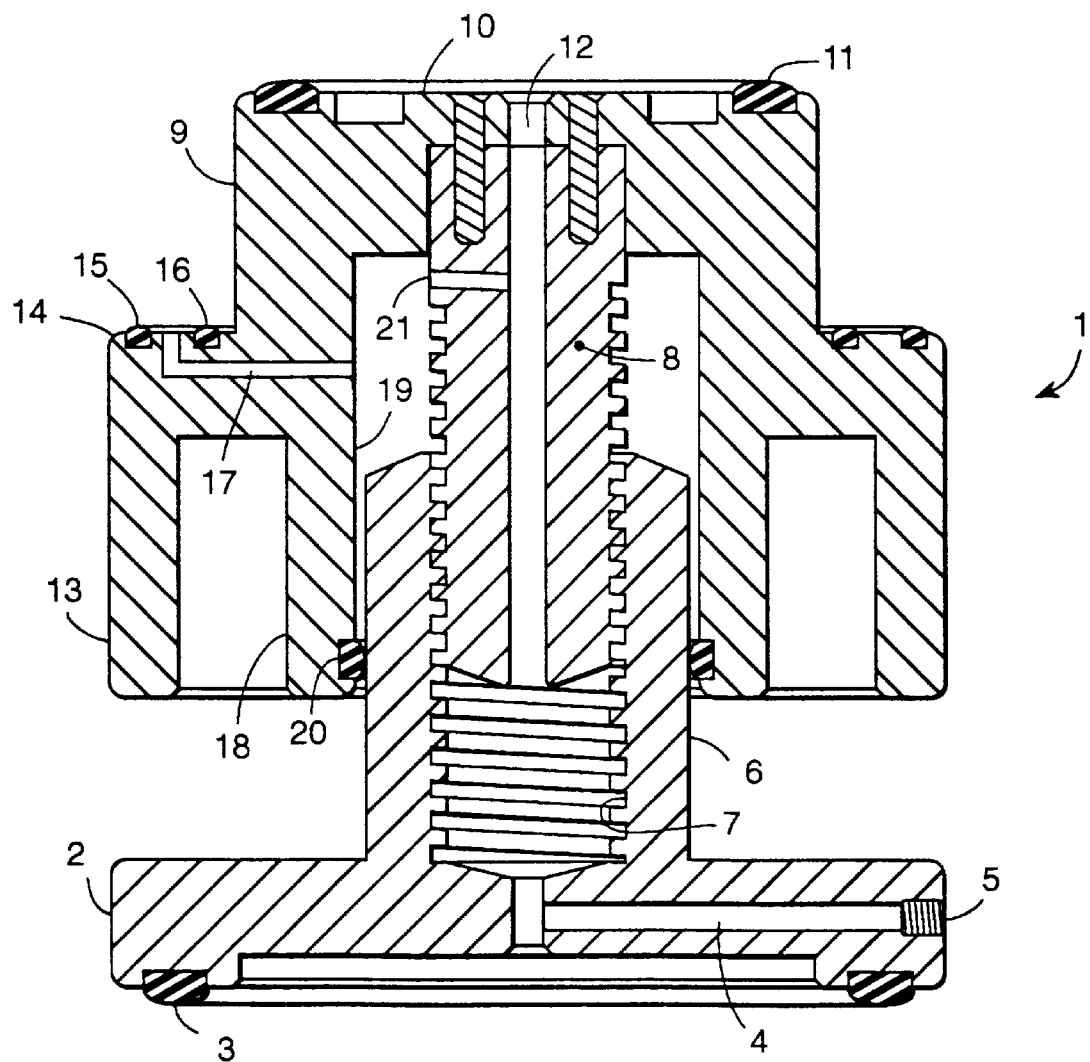
FIG. 1 shows a sectional view of a distance piece or supporting block of the system according to the invention.
Figure 2:
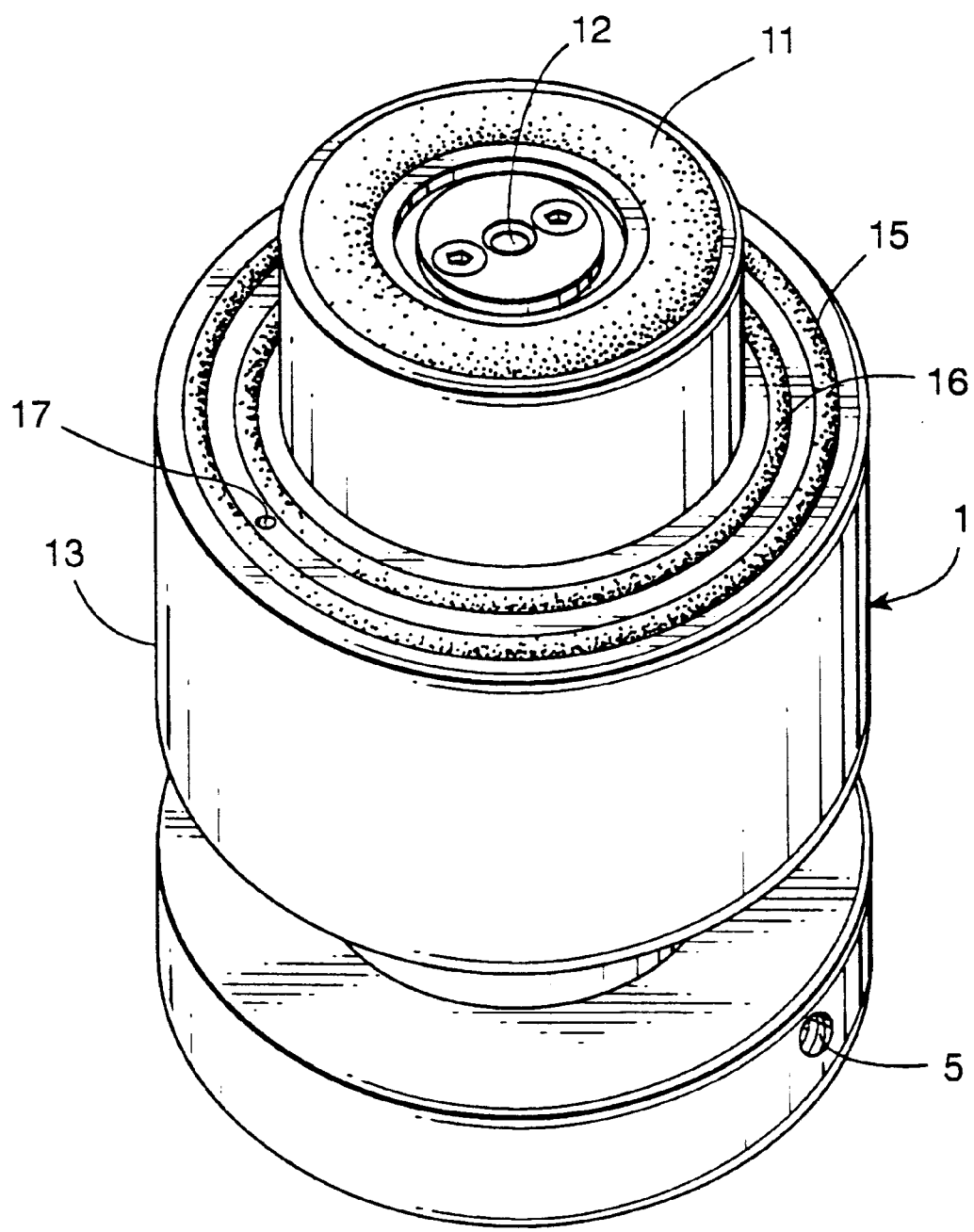
FIG. 2 shows a perspective view of the distance piece or supporting block shown in FIG. 1.
Figure 3:
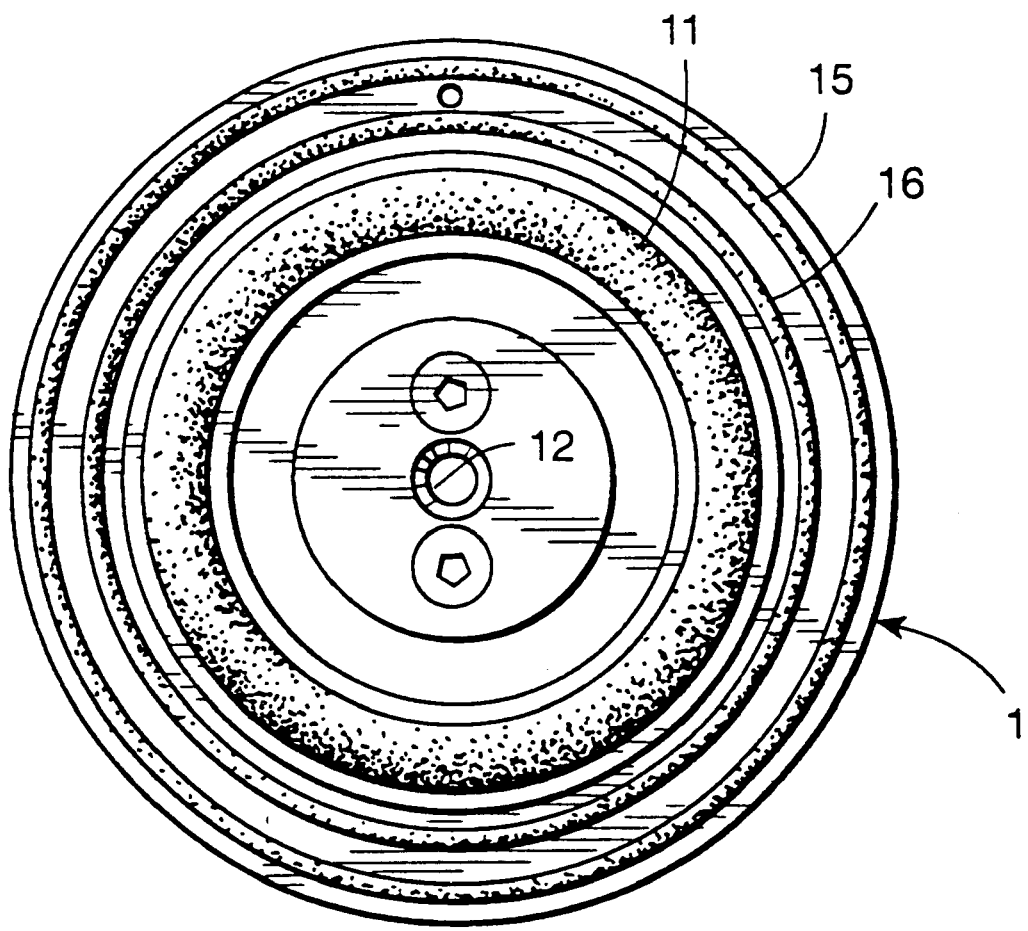
FIG. 3 shows a top plan view of the distance piece or supporting block of FIG. 2.

FIGS. 1, 2 and 3 show one of the mechanically adjustable pneumatically activated distance pieces or supporting blocks 1 that comprises a base 2 with a suction seal 3 connected to a vacuum tube 4 that ends in a nipple 5 connected to a conventional vacuum source (not shown).

The base 2 is produced in a single body with a column 6 threaded internally at 7, into which can be screwed a threaded shaft 8.

Fixed to the top end of the shaft 8 is a supporting component 9 shaped like an inverted cup and having on its upper end a bearing face 10 with an annular seal or suction cup 11, the interior of which is connected to a suction tube 12.

The supporting element 9 is provided with a collar 13 having an annular step 14 with concentric annular seals 15 and 16 forming a suction cup connected to the vacuum channel 17.

The supporting element 9 also possesses a hollow cylinder 18 having an internal surface 19 designed to fit around the column 6. Another seal 20 ensures continuity of the vacuum and a hole 21 gives connection of the vacuum between the parts.

During use, a slab 23 of marble, stone, glass or the like is laid on the seal 11 of the end surface 10, and the collars 13 are rotated until all the distance pieces or supporting blocks 1, shown in FIG. 1, have the same height.

Figure 4:
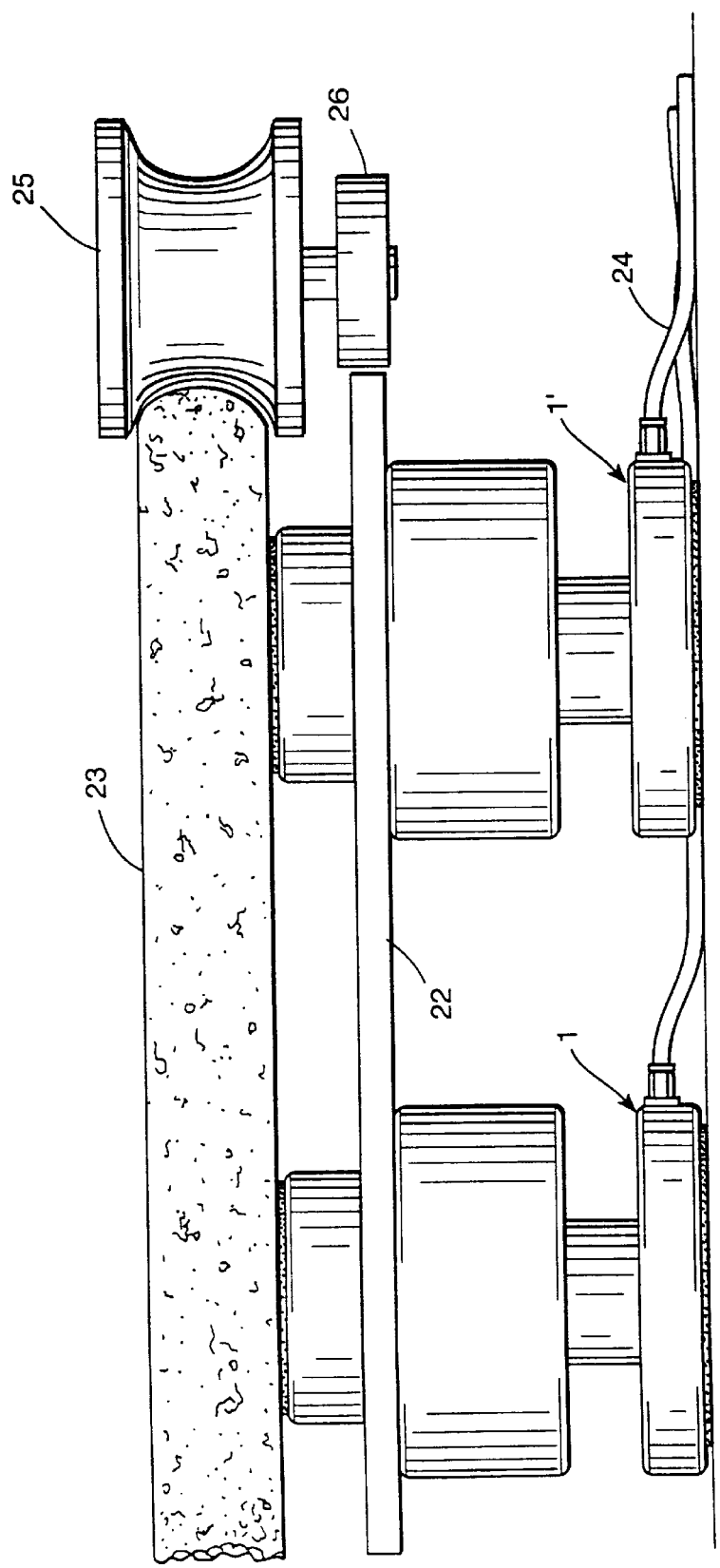
FIG. 4 shows diagrammatically the machining system according to the invention.

A template 22 is first positioned on the annular step 14. The arrangement is shown more clearly in FIG. 4 in which two distance pieces or supporting blocks 1, 1' are used to support a template 22, while a slab workpiece 23 is supported on the end surface 10 of the distance pieces or supporting blocks 1, 1'.

A vacuum tube 24 connects the various distance pieces or supporting blocks 1, 1' (of which only two are shown in the drawing) to a vacuum source.

A machining tool indicated diagrammatically at 25, belonging to a profiling machine known in the art, is fitted with a tracer 26 that can follow, under the control of an operator, the profile of the template 22 on the workpiece slab 23.

Once the various operations have been carried out, the vacuum is released and the various parts can be separated from each other.

Figure 5:
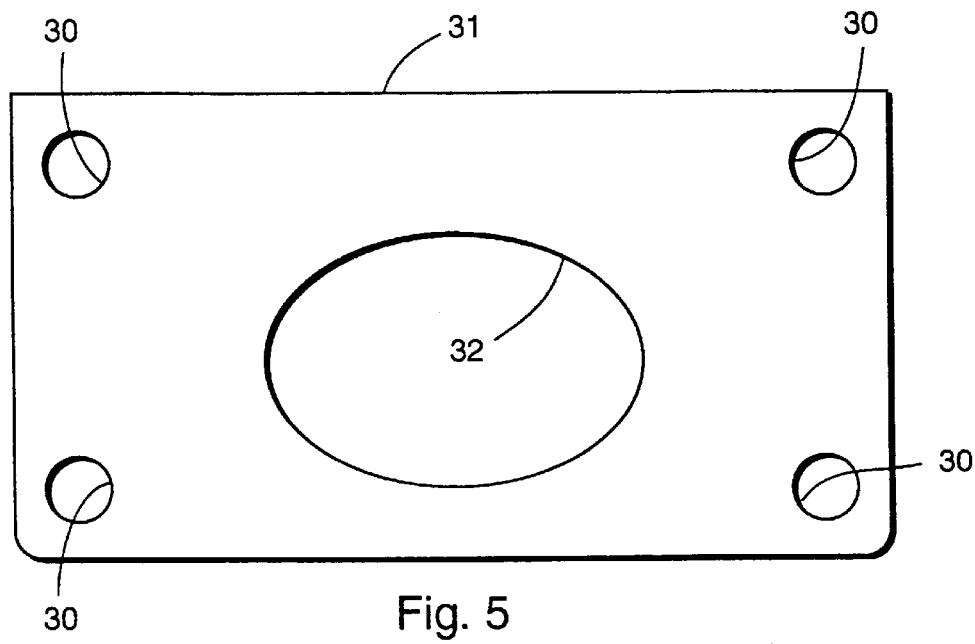
FIGS. 5 and 6 show examples of machining templates that can be used.
Figure 6:
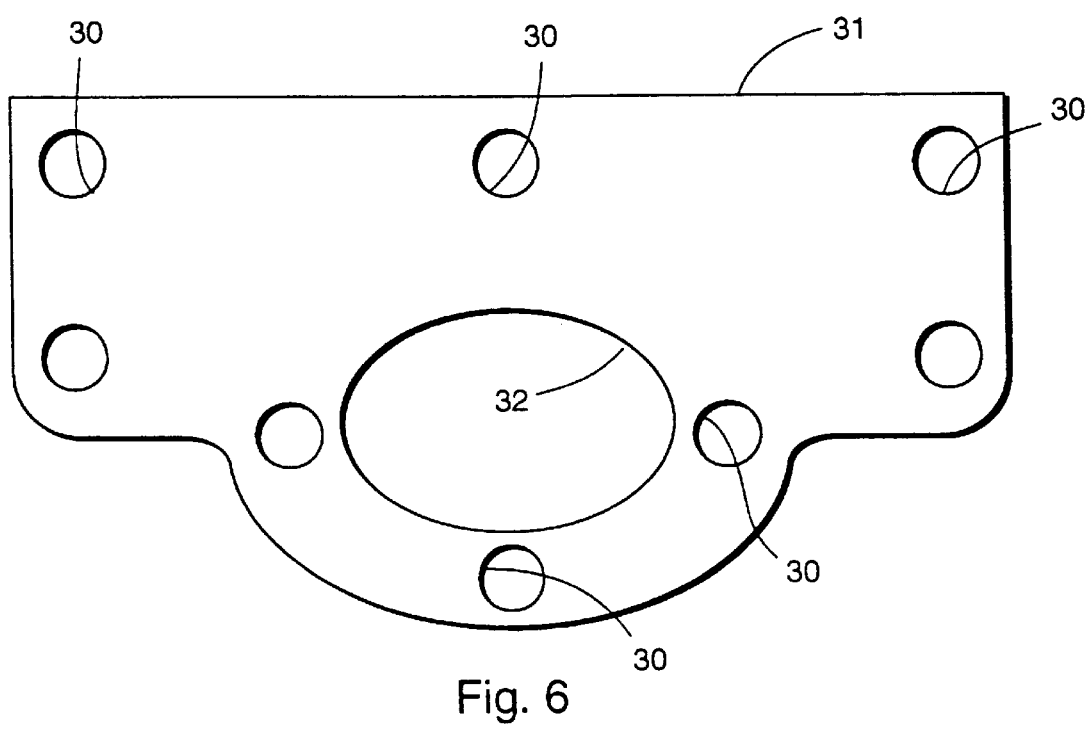

FIGS. 5 and 6 show examples of templates. The holes 30 indicated in these Figures are intended for the insertion of the supporting components 9 discussed earlier. The lines 31 and 32 show the outlines of the templates 22 that are to be copied on the slab of marble, stone, glass or the like by the machining operation.

Figure 7:
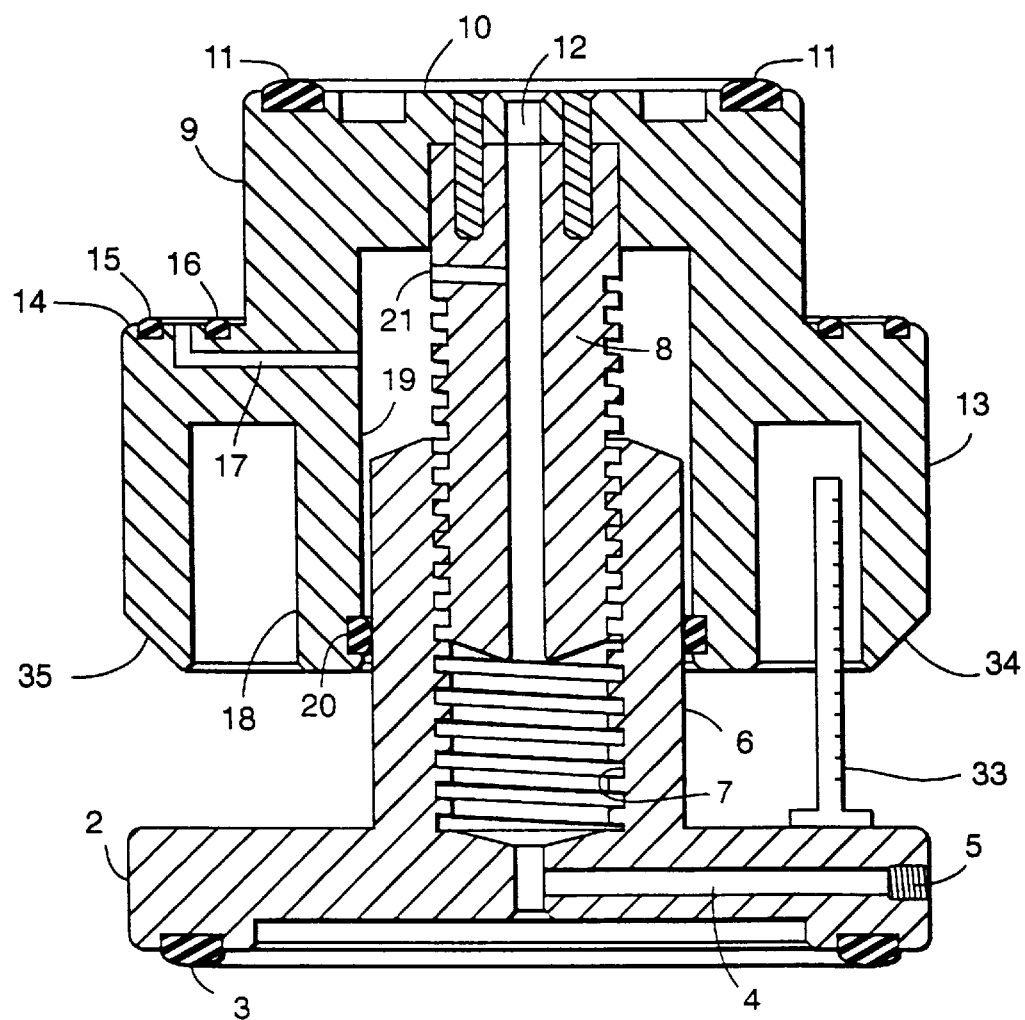
FIG. 7 shows a variant of the distance piece or supporting block illustrated in FIG. 1.

FIG. 7 shows a variant of the construction shown in FIG. 1, in which a graduated component 33 is used in combination with the edge 34 of the collar component 13, which is advantageously given a bevel 35 to facilitate mechanical adjustment of the height of the distance pieces or blocks 1, 1'.

The present invention has been described with reference to certain currently preferred embodiments, but it will be understood that variants and modifications can in practice be made by a person skilled in the art without departing from the scope of the protection of the present specification.

What is claimed is:

1. System for the profile machining of a slab of material using a template, comprising a plurality of mechanically adjustable pneumatically operating distance pieces defining supporting blocks; each distance piece being adjustable in height by means of a screw and nut arrangement and being provided with suction seals on an end surface thereof to support the slab, on an annular step thereof to fix the machining template, and on a base thereof to fix the assembly of slab, template and distance piece firmly to a workbench, as the slab is being machined; and wherein said suction seals are connectable to suction tubes that terminate in a connecting nipple that is connectable to a pneumatic vacuum source.

2. System according to claim 1, wherein the machining template is provided with a plurality of holes on the inside of the profile to be machined, the holes being laid out in such a way as to fit the annular step part of the distance pieces.

3. System according to claim 1, wherein the suction seals can communicate with each other and with a connector that is connectable with corresponding connectors of other distance pieces and with a common vacuum line connectable to a pneumatic vacuum source.

4. System according to claim 1, wherein the distance pieces comprise a base part provided with a first thread and an upper supporting component shaped substantially like an inverted cup which is provided with a second thread engaging with the first thread and surrounds a column part made in one piece with the base.

5. System according to claim 1, wherein the profile of the template is arranged to cooperate with a guide tracer component that limits the cut of a tool machining the profile of the slab of material being machined.

6. System according to claim 1, wherein the slab of material being machined is made of one of marble, stone, granite, and glass.

7. System according to claim 4, wherein the base comprises a graduated reference component arranged to be used in combination with the upper supporting component to facilitate the height positioning of the distance pieces.

* * * * *